Figure 1:
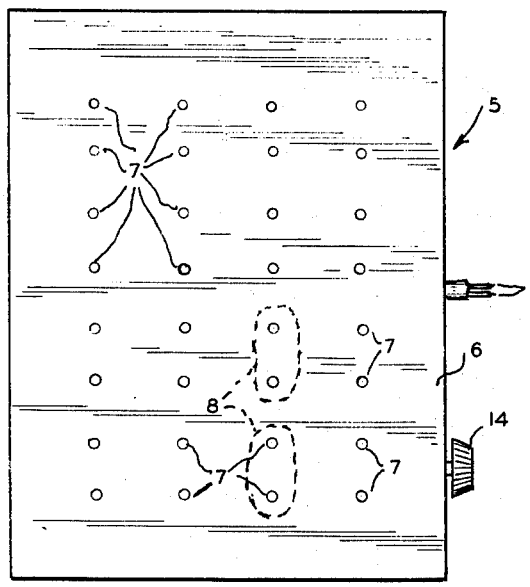

Oct. 17, 1961   R. R. MOORE ET AL   3,005,154
MOISTURE TESTING ELECTRODE ASSEMBLY
Original Filed June 14, 1956

INVENTORS
ROBERT R. MOORE
LESTER R. RABB
BY
ATTORNEY

United States Patent Office 3,005,154
Patented Oct. 17, 1961

3,005,154
MOISTURE TESTING ELECTRODE ASSEMBLY
Robert R. Moore, Glenview, and Lester R. Rabb, Evanston, Ill., assignors to Moore-Milford Corporation, Evanston, Ill., a corporation of Illinois
Continuation of abandoned application Ser. No. 591,359, June 14, 1956. This application Nov. 6, 1958, Ser. No. 772,653
2 Claims. (Cl. 324—65)

This invention relates to moisture testing instruments of the type wherein indication of moisture is ascertained by indication of the magnitude of an effect of the tested material upon an electrical condition, the magnitude of which effect is affected in known fashion by the moisture content of the material, affords an accurate indication of moisture content of that material.

The present application is a continuation of the copending Robert R. Moore et al. application, Serial No. 591,359, filed on June 14, 1956, and now abandoned, which application Serial No. 591,359 is a continuation in part of our copending application Serial No. 493,952, filed March 14, 1955, and now abandoned, which applications are assigned to the same assignee as the present application.

A typical example of a moisture content ascertainment arrangement of the general character in question and that makes use of the specific characteristic of resistivity of the test material is that disclosed by our copending application for United States Patent, Serial No. 493,952, filed March 14, 1955. As set forth in that patent, careful selection of the controllable resistance-contributing factors of an electrical path through a body of test material, which factors are length of path and contact resistance, areas of contact between electrode and material, permits both adjustment of the total path resistance to the accurately interpretable resistance range of a given ohmeter instrument, and adjustment of the resistance of the controllable factors to the resistivity range of the material being tested, to permit the moisture content responsive resistance value of the latter to be a significant and interpretable factor of the total resistance path.

The present invention relates to problems presented by ascertainment of a single resistance value of a plurality of electrical paths through the test material, primarily for the purpose of obtaining indication of an approximation of the average moisture content of plural bodies or samples of material, such as from different portions of a lot, batch or package. While, due to establishment of parallel resistance measurement paths through a plurality of such bodies, the overall indication will be one of magnitude of total effective resistance in accordance with Ohm's law of parallel resistances, in the usual situation requiring such testing, the resistances of all tested bodies will be sufficiently nearly equal to be satisfactory for purposes of a true average, and material difference of the resistance of the individual path through one body from the resistances of the others in any event will be indicated to an experienced operator by the difference between the value indicated by the instrument and the range of values reasonably to be expected for the particular test.

An important novel feature of the instrument provided by the invention is the provision of an arrangement whereby, by a simple switching adjustment the electrode pattern connected in the test circuit may be established. For example, a single electrode assembly having a number of electrode pairs that is a square may be so connected that selectively all electrode pairs are connected parallel, or numbers of electrode pairs equal to the root of the square may be connected in a number of series also equal in number to the root.

Figure 3:
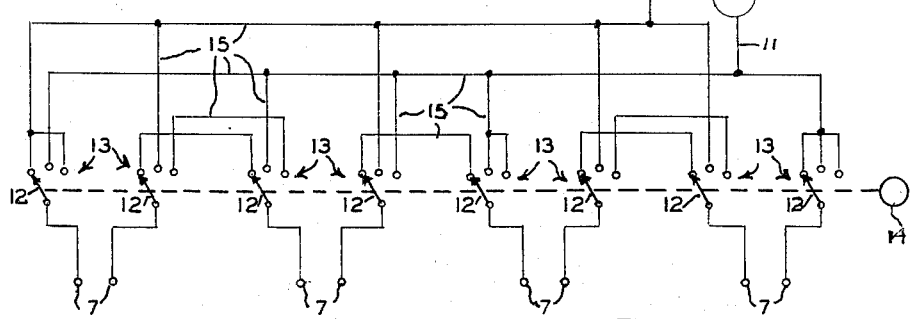
Figure 2:
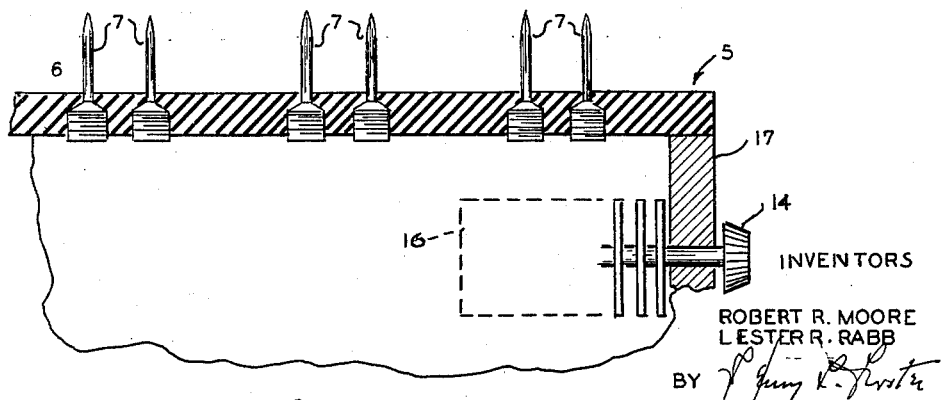

In the accompanying drawing:
FIG. 1 is a plan of an electrode assembly arranged according to the invention.
FIG. 2 is a partial vertical section of such an assembly.
FIG. 3 is a schematic circuit diagram showing one switching arrangement.

In the following specification and claims the word "pair" applied to electrodes is intended to include arrangements wherein families of electrode pairs are closely grouped and connected as the pairs of single electrodes are shown.

Describing the drawing in detail, the electrode assembly conveniently takes the form of a box 5 having a top 6 of insulating material wherein are mounted the paired electrodes 7, in such relative proximity that bodies of material, such as indicated at 8, may be brought into contact with them. The number of electrode pairs of a particular assembly is subject to wide selective variation, depending on such factors as the resistivity range of the material or materials to be tested. In FIG. 1 the assembly is illustrated as including sixteen electrode pairs and in FIG. 3 the circuit is shown as being provided with four such pairs.

The testing arrangement includes an ohmeter circuit shown in simple form in FIG. 3 as including a voltage source 9 and an ammeter 10, by means of which resistance may be ascertained of an electrical path established across a pair of circuit leads 11.

By means of a switching arrangement such as is shown in FIG. 3, provision may be made for selection among various patterns of effective electrode pairs. For example, each electrode 7 is shown connected to the movable contactor 12 of a different single pole triple throw switch 13, the contactors of which are ganged for simultaneous positioning by an actuator 14. By suitably connected leads 15 that interconnect various contacts of switches 13, and certain ones of the contacts with circuit leads 11, provision is made for connecting all pairs of electrodes 7 in series and across leads 11, or all pairs parallel and across leads 11, or to establish two series of two electrode pairs each, both series connected across leads 11. By this arrangement, once the test bodies are impaled on the pairs of electrodes certain ones of the leads 15 are connected to the pairs of electrodes by the switch 13 so that irrespective of the resistance of the test bodies the deflection of the current responsive meter 10 occurs at mid scale for one of the electrode connections, with the result that the tolerable range of moisture content for the test bodies is obtainable from the meter 10.

It is to be understood that meter 10 is calibrated according to the resistance-moisture content characteristic of a given material, or a group of materials to be tested by a single instrument. The square arrangement of electrode pairs permits the same calibration to be used for interpretation of resistance of a single body of material connected across a single pair of electrodes 7, as well as interpretation of the resistance value of a squared number of bodies each connected across a different pair of electrodes that are connected in a number of electrode pair series equal to the root of a square total number of electrode pairs, and each series consisting of the same root number of pairs. For example, if the resistance of a single test body of a sample of material is equal to one ohm and four units of the material are impaled on respective pairs of electrodes and the pairs of electrodes connected so that two test bodies are serially connected in one parallel branch and the other two test bodies are serially connected in a second parallel branch then, the resultant resistance of the test bodies is equal to one ohm, the same value of resistance as a single test body.

Conveniently, and as suggested by FIG. 2, the switching arrangement including switches 13 of FIG. 3 may be in the form of a multiple deck rotary switch 16 mounted in a sidewall 17 of structure 5.

Electrodes 7 most usually are made as duplicates, so that equal areas of contact are established between electrodes and bodies of material undergoing testing. They are shown as pin or probe type electrodes that are to be embedded in the material to equal depths, by impaling the bodies upon the electrodes of a pair.

It will be apparent from the foregoing that many modifications and variations may be made of the specific exemplary disclosures, and it is to be understood that the limits of the invention are to be ascertained solely from the appended claims.

We claim:

1. An electrical system for providing an indication corresponding to the moisture content of a plurality of test bodies comprising a plurality of pairs of electrodes, said plurality being a squared number, the electrodes in each pair being spaced identically apart to provide substantially equal effective lengths of electrode paths between the electrodes of each pair, electrical test circuit means for measuring the equivalent resistance across its terminals, a pair of terminal leads electrically connected to said test circuit terminals, a plurality of branch leads electrically connected to said electrodes, and switch means for connecting selective ones of said branch leads to said terminal leads, said switch means being movable to a first position to connect said pairs of electrodes in parallel, to a second position to connect said pairs of electrodes in series, and to a third position to connect the pairs of electrodes in a number of parallel branches equal to the square root of the number of said pairs of electrodes, the number of pairs of said electrodes serially connected in each branch being equal to the square root of the total number of said pairs of electrodes.

2. In an electrical test system for providing an indication corresponding to the moisture content of a material including an electrical test circuit means for measuring the equivalent resistance across its terminals, a plurality of pairs of equally spaced electrodes connectable to a plurality of branch circuits which are connected to said electrical test circuit terminals, said plurality being a squared number, switch means for connecting said pairs of electrodes and selective branch circuits in predetermined electrical paths comprising a plurality of sets of contacts electrically connected to said branch circuits and a plurality of sets of wipers respectively engageable with different ones of said sets of contacts, said wipers being movable to a first position to connect all of said pairs of electrodes in parallel across the test circuit, to a second position to connect all of said pairs of electrodes in series across the test circuit and to a third position to connect said pairs of electrodes in a number of parallel branches equal to the square root of the number of said plurality of pairs of electrodes, each branch including a number of serially connected pairs of electrodes equal to the square root of the number of said plurality of pairs of said electrodes.

References Cited in the file of this patent

UNITED STATES PATENTS

| | | |
|---|---|---|
| 1,821,605 | Andersen | Sept. 1, 1931 |
| 2,094,234 | Drain | Sept. 28, 1937 |
| 2,122,363 | Christie | June 28, 1938 |
| 2,326,352 | Greenslade | Aug. 10, 1943 |
| 2,587,771 | Schoenbaum et al. | Mar. 4, 1952 |
| 2,870,404 | Oxley | Jan. 20, 1959 |

FOREIGN PATENTS

| | | |
|---|---|---|
| 47,820 | Norway | Dec. 28, 1931 |

UNITED STATES PATENT OFFICE
Certificate of Correction

Patent No. 3,005,154                                      October 17, 1961

Robert R. Moore et al.

It is hereby certified that error appears in the above numbered patent requiring correction and that the said Letters Patent should read as corrected below.

In the sheet of drawing, FIG. 3 should appear as shown below instead of as in the patent:

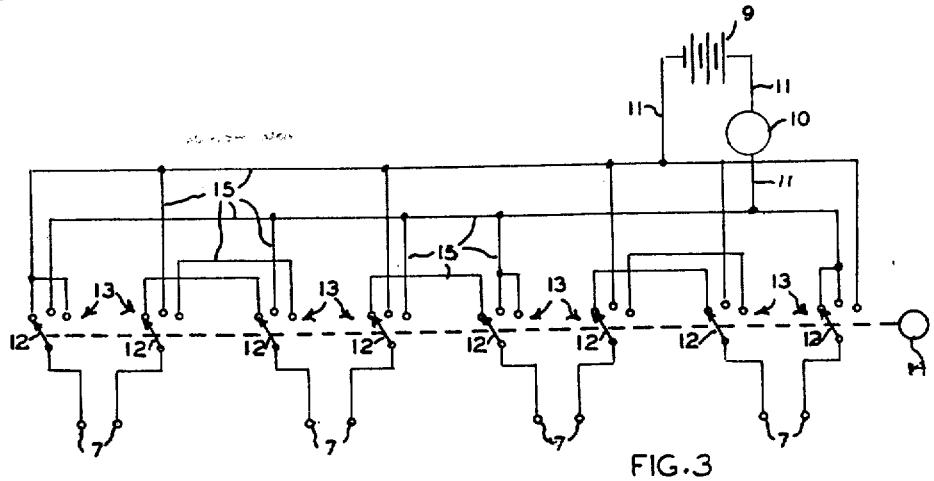

Signed and sealed this 24th day of April 1962.

[SEAL]

Attest:
ESTON G. JOHNSON,
*Attesting Officer.*

DAVID L. LADD,
*Commissioner of Patents.*